Aug. 18, 1942.   C. H. ADAMS   2,293,273
STOCK REEL FOR MULTIPLE SPINDLE MACHINES
Filed July 17, 1940   2 Sheets-Sheet 1
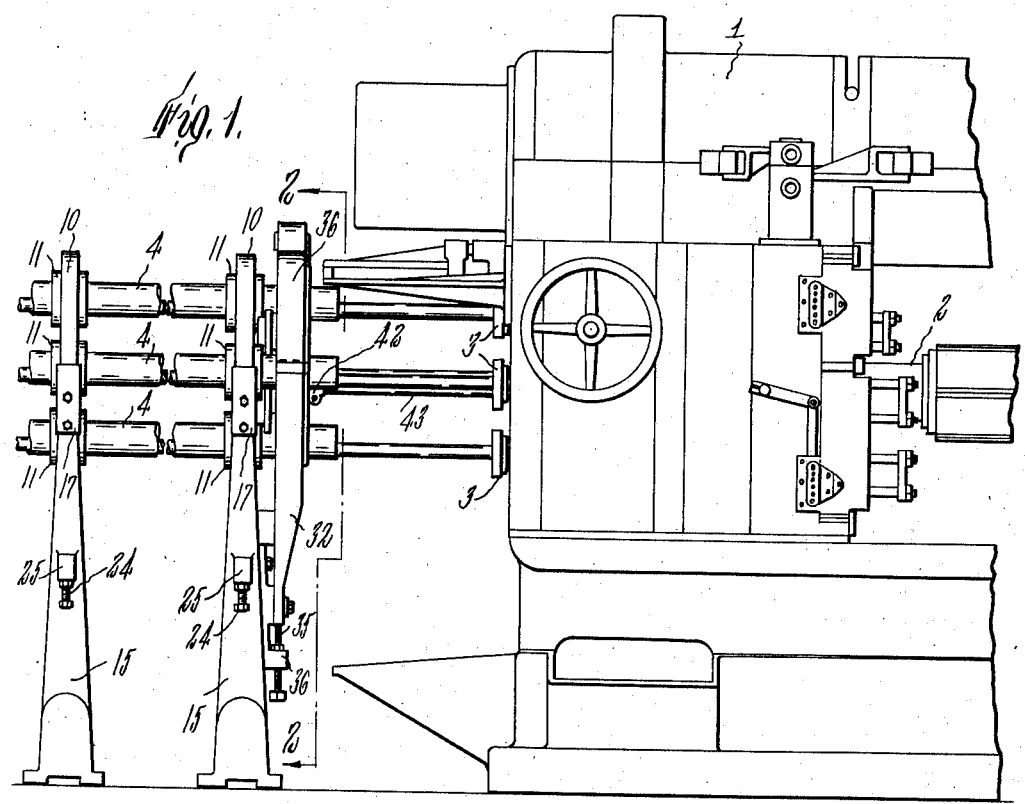
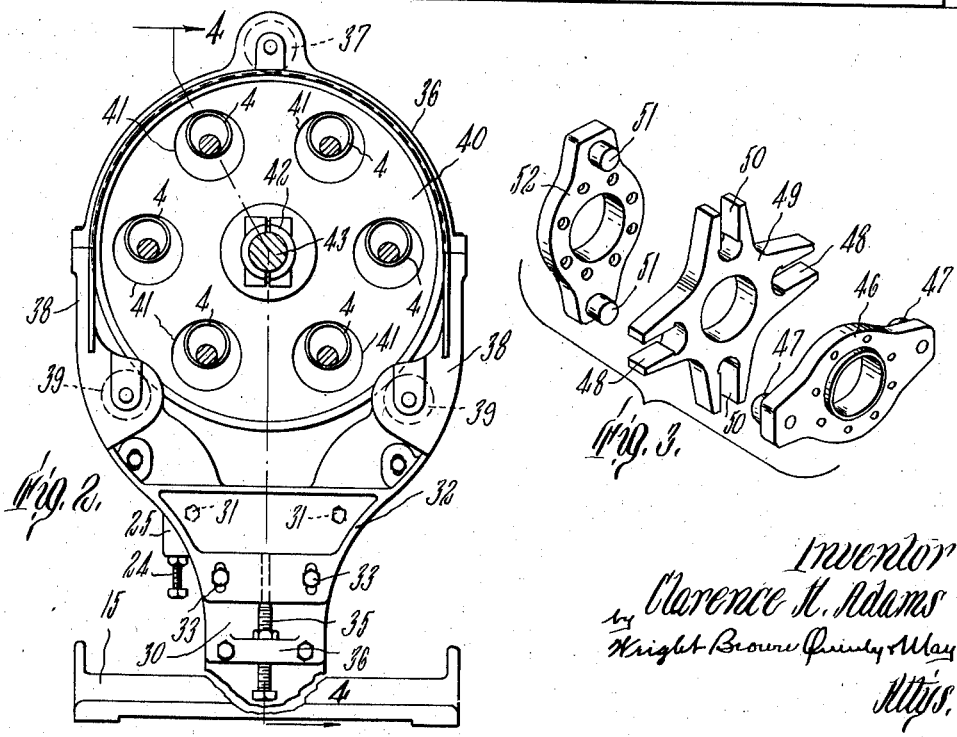
Inventor
Clarence H. Adams
by Wright Brown Quinby May
Attys.

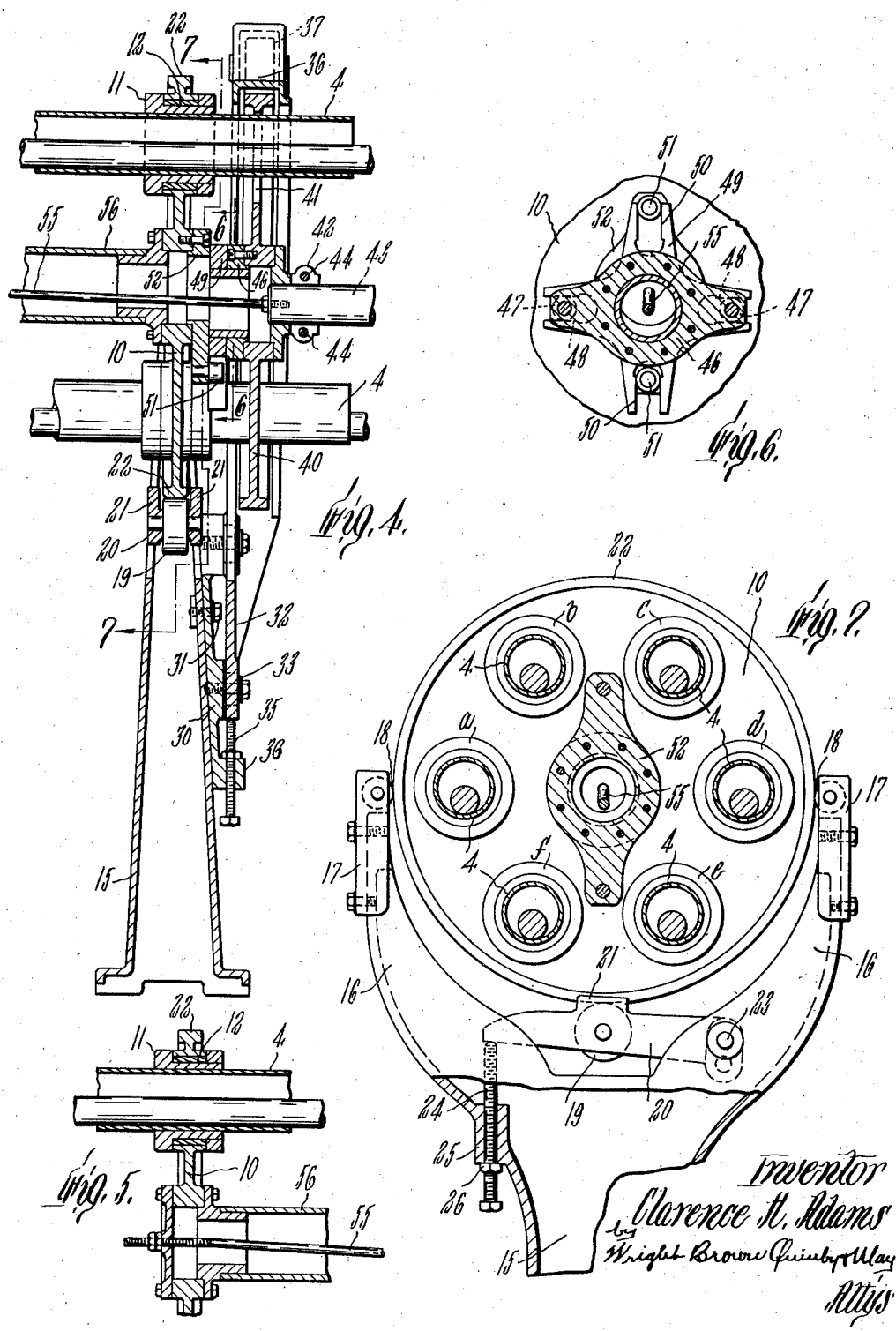

Patented Aug. 18, 1942

2,293,273

UNITED STATES PATENT OFFICE 2,293,273

STOCK REEL FOR MULTIPLE SPINDLE MACHINES

Clarence H. Adams, Windsor, Vt., assignor to Cone Automatic Machine Company Inc., Windsor, Vt., a corporation of Vermont Application July 17, 1940, Serial No. 345,963

8 Claims. (Cl. 29—37)

It is usual practice in connection with automatic lathes, or the like, which operate on bar or tubular stock, to support the stock extending backwardly from the work spindle. In the case of a multiple spindle lathe such stock is supported in a stock reel. Such a reel is commonly provided with tubular supports within which the several work pieces extend, this reel being indexed with the work spindles.

The present invention has for an object to provide such a stock reel wherein the stock may be supported substantially coaxial with the work spindle regardless of the size of the stock and without requiring changes in the sizes of the stock reel tubes, and with the axial centers of the stock pieces in substantially coaxial relation to the corresponding work spindles.

In accordance with this invention, therefore, this adjustment for stock size is made by up and down adjustment of the stock reel as a unit, the stock supporting tubes being of a size to receive the largest pieces of work. Means are also provided for indexing the reel in time with the indexing of the spindle carrier, regardless of such up and down adjustment of the reel.

For a more complete understanding of this invention, reference may be had to the accompanying drawings, in which Figure 1 is a fragmentary side elevation of the work spindle end of a multiple spindle lathe showing the stock reel of this invention.

Figure 2 is a detail section on line 2—2 of Figure 1.

Figure 3 is an exploded perspective of the reel-indexing drive mechanism.

Figure 4 is a detail section on line 4—4 of Figure 2.

Figure 5 is a view similar to a portion of Figure 4, but at the remote end of the reel.

Figures 6 and 7 are detail sections on lines 6—6 and 7—7, respectively, of Figure 4.

Referring first to Figure 1, there is shown at 1 the spindle end portion of an automatic lathe of the well known Cone type as shown, for example, in Cone Patent No. 1,934,620 granted November 7, 1933, having the usual rotary spindle holder mounted for rotation about the axis of a shaft 2 and carrying the rotary work spindles 3 arranged in circular array about the axis of the shaft 2. As shown herein the machine is of the six-spindle type instead of the eight-spindle machine shown in the Cone patent above noted, three of the six spindles being shown in Figure 1, though it should be evident to those skilled in the art that the invention is not limited to any particular number of work spindles. As in machines of this type, the work spindles carry stock in the form of bars or tubes which extend through the work spindles, the ends projecting from the chuck ends of the spindles being operated upon by tools at the various operative stations, after which operations the work holder is indexed about the axis of the shaft 2 to bring the work successively into the various angular positions or stations where tooling operations are performed thereon. After the last tooling operation, the tooled work piece is cut off from the remainder of the stock and the stock is fed forwardly to present a new portion for the subsequent machining operations.

In order to support the stock extending backwardly from the machine, stock reels have heretofore been employed, these stock reels being provided with tubular work supports such as pipes 4 which are arranged in circular series corresponding to the spindles and in substantial axial alinement therewith. Machines of this type have certain size ranges of stock which they can take, in each instance, however, the stock being arranged coaxially in the work spindles. Various parts such as the work-gripping and feeding means have to be chosen in accordance with the particular size of stock being operated upon at any particular time.

When substantial change of stock size has been made heretofore, it has been necessary to change stock reels in order to employ a stock reel suitable for that particular size of stock, since the larger size tubes 4 would not support the smaller sized stock in axial alinement with the spindles and the smaller size tubes would not receive the larger size stock. In accordance with this invention, however, means are provided by which the small size stock can be supported in approximately axial alinement with the work spindles as well as the large sized stock, in the same stock reel and without changing the size of the stock supporting tubes or their spacing. It is then quite unnecessary to change stock reels when the size of stock is changed, it being only necessary to effect an easy adjustment in accordance with the particular size of stock to which change is made. This may be done also without interfering in any way with the indexing motion of the stock reel simultaneously with the indexing motion of the spindle carrier.

In accordance with one embodiment of this invention, therefore, the pipes 4 of the stock reel within which the extended ends of the stock are supported, are mounted in holders 10, herein shown as of annular form, having portions 11 through which the tubes 4 pass, these portions being preferably rotatably mounted in circular openings 12 in the holders 10. These openings 12 are arranged in circular array about the center of rotation of each holder and are spaced corresponding to the rotary work spindles in the spindle holder of the machine, and the tubes 4 are of sufficiently large diameter to take the stock of the maximum size which can be taken by the spindles. These holders 10 are supported in reel stands 15, these reel stands being spaced apart as desired and each having a forked upper end between which the corresponding holder 10 may extend. Each of these forked extensions 16 may have secured thereto a bearing roller carrier block 17 within which is journaled a bearing roller 18 which may be engaged with the periphery of the holder 10. The lower edge of the holder 10 rests upon a roller 19 journaled between the spaced sides of a lever 20, these sides being upwardly extended as at 21 to form a pocket for the reception of the periphery of the holder 10 which may be axially extended to form a rim 22. The lever 20 is pivoted at one end as on the fulcrum pin 23 and it may have a pair of openings through either of which the pivot pin 23 may be inserted so that the lever 20 may be substantially horizontal when in its adjusted position so that the pocket 21 will have an engagement of substantial length on the rim 22. The other end of the lever 20 is supported on the upper end of a screw 24 threaded through a boss 25 integral with the standard 15. By adjustment of this screw the elevation of the pocket may be adjusted, thereby to raise or lower the holder 10. A lock nut 26 threaded on the screw 24 and engaging the lower end of the boss 25 may be used to secure the screw 24 in adjusted position. Each of the standards 15 is provided with this vertical adjustment and that standard next to the lathe has secured thereto a bracket 30 as by the bolts and nuts at 31, this bracket supporting for vertical adjustment a guide member 32. This guide member 32 may be provided with screw and slot connections at 33 with the bracket 30 and an adjusting screw 35 threaded through a boss 36 on the bracket 30 may impinge on the lower end of the guide member 32, whereby its elevation may be adjusted. This member 32, as shown best in Figures 2 and 4, is provided with an arcuate top portion 36 within which is journaled a bearing roll 37, this arcuate top portion being secured to the parts of a bifurcated upward extremity 38 of the guide member 32. These bifurcations also have journaled therein the bearing rolls 39 and between the bearing rolls 37 and 39 is journaled a member 40. This member is shown as of ring form and is provided with enlarged openings 41 through which may extend the inner ends of the tubular work supports 4 throughout the range of relative vertical adjustments of the stock reel supports 10 and the member 40. It is not, however, essential that the openings 41 be circular as shown. The member 40 is provided with a two-part hub member 42 in which is keyed the outer end of a shaft 43 which is secured to the spindle holder coaxially therewith so that as the spindle holder is indexed the shaft 43 is rotated through a corresponding angular extent. The two-part member 42 may be clamped onto the shaft 43 as by means of the screws 44 (see Figure 4). To the outer face of the member 40 is secured one element 46 of a flexible coupling, this member 46 having a pair of spaced pins 47 projecting from its outer face which may ride in slots 48 in an intermediate coupling member 49. This member 49 is also provided with a pair of slots 50 at right angles to the slots 48 within which may ride pins 51 on a coupling member 52 similar to the coupling member 46 but arranged at right angles thereto. This coupling member 52 is secured to the outer face of the adjacent holder 10 for the pipes 4. The pins are retained in position within the central coupling member 49 as by a flexible tie rod 55 threaded into the outer end of the shaft 43 at its inner end and extending through a central tubular member 56 joining the two spaced holders 10 and suitably secured to the outer one of these holders. The member 40 is adjusted vertically by adjustment of the member 32 so as to be positioned coaxial with the spindle carrier, and the stock reel is adjusted vertically relatively thereto by adjustment of the screws 24.

Where the stock is of the maximum size capable of being carried by the spindles, the stock reel is adjusted so that the extended ends of the stock are supported freely on the bottom faces of the tubes 4 and where the tubes 4 are of the same internal diameter as the spindles, these tubes will be arranged at such an elevation that they are coaxial with the spindle. For smaller sized stock the stock reel is elevated with respect to the spindles so that the stock of this smaller size is also supported substantially coaxial with the work spindles. It will be noted from an inspection of Figure 7 that elevation of the stock reel causes the radial distances of the centers of the stock to the axis of the shaft 43 and the axis of the spindle carrier to be maintained substantially constant regardless of the size of the stock, the centers of the stock being maintained in the same vertical lines regardless of such adjustment. Thus the distances horizontally between the stock centers at the stations $a$ and $d$ from each other correspond to the spacing of the centers of the spindles in the corresponding positions regardless of the size of the stock and likewise the stock at the other stations $b$, $c$, $e$, and $f$ are likewise maintained approximately coaxial with the rotary work spindles regardless of the stock sizes. Throughout the range of work size suitable for one machine the departures from exact coaxial arrangement are too small to be troublesome.

It should be evident from the foregoing description of an embodiment of this invention that various changes and modifications might be made without departing from the spirit or scope of this invention as defined by the appended claims.

I claim:

1. The combination with a spindle holder having a plurality of rotary work spindles in circular array about an axis of rotation of said holder, of a stock reel having a plurality of tubular work supports in circular array about an axis of rotation for holding portions of the work pieces projecting from said spindles, connections between said reel and holder causing rotation of said holder to cause simultaneous rotation of said reel about its axis, and means for adjusting said reel up and down with relation to said spindle holder and in or out of axial alinement with said holder in accordance with the size of the work, said connections including a flexible coupling arranged for operation while said reel and holder are coaxial and also when said reel and holder are adjusted out of coaxial relation.

2. In combination with a spindle holder having a plurality of rotary work spindles in circular array about an axis of rotation of said holder, of a stock reel having a plurality of tubular work supports in circular array about an axis of rotation for holding portions of the work pieces projecting from said spindles, means for adjusting said supports upwardly to bring their work supporting tubes above axial alinement with their corresponding spindles to support work of smaller diameter than said tubes are capable of receiving out of coaxial relation with respect to their respective tubes and in substantial axial alinement with their respective spindles, and means connecting said supports and turret for simultaneous indexing motion regardless of such upward adjustment of said supports.

3. The combination with a spindle holder having a plurality of rotary work spindles in circular array about an axis of rotation of said holder, of a stock reel having a plurality of tubular work supports in circular array about an axis of rotation for holding portions of the work pieces projecting from said spindles, a shaft coaxial with said spindle holder extending toward said stock reel, means for supporting the extended portion of said shaft for rotation wtih said spindle holder, means actuable to adjust said stock reel up and down with respect to said spindle holder, and means for operatively connecting said shaft and stock reel for simultaneous rotation with the axis of said reel in or out of alinement with the axis of said spindle holder in accordance with the size of the work.

4. The combination with a spindle holder having a plurality of rotary work spindles in circular array about an axis of rotation of said holder, of a stock reel having a plurality of tubular work supports in circular array about an axis of rotation for holding portions of the work pieces projecting from said spindles, a shaft coaxial with said spindle holder extending toward said stock reel, a member carried by said shaft extension having a circular periphery, means engaging said periphery for journaling said support, means actuable to adjust said stock reel up and down, and connections from said member to said reel including a flexible coupling causing rotation of said holder to cause corresponding rotation of said reel whether or not said stock reel and spindle holder are in axial alinement.

5. The combination with a spindle holder having a plurality of rotary work spindles in circular array about an axis of rotation of said holder, of a stock reel having a plurality of tubular work supports in circular array about an axis of rotation corresponding to the circular array of said work spindles in said spindle holder and holding portions of the work pieces projecting from said spindles, spaced members carrying said tubular work supports, rollers for supporting said members, means for raising or lowering certain of said rollers to raise or lower said tubular work supports as a unit, and connections including a flexible coupling between said spindle holder and said reel for causing rotation of said spindle holder to correspondingly rotate said reel whether or not said stock reel and spindle holder are in axial alinement.

6. The combination with a spindle holder having a plurality of rotary work spindles in circular array about an axis of rotation of said holder, of a stock reel having a plurality of tubular work supports in circular array about an axis of rotation corresponding to the circular array of said work spindles in said spindle holder and holding portions of work pieces projecting from said spindles, spaced members carrying said tubular work supports, rollers for supporting said members, certain of said rollers being positioned beneath the members supported thereby, a lever supporting each of said certain rollers, and mounted for up and down swinging motion, means for adjusting said levers for raising and lowering said members to position the axes of said members in alinement with or above the axis of said spindle holder, and connections including a flexible coupling between said spindle holder and said reel for causing rotation of said spindle holder to correspondingly rotate said reel whether said axes are in or out of axial alinement.

7. The combination with a spindle holder having a plurality of rotary work spindles in circular array about an axis of rotation of said holder, of a stock reel having a plurality of tubular work supports in circular array about an axis of rotation corresponding to the circular array of said work spindles in said spindle holder and holding portions of the work pieces projecting from said spindles, spaced members carrying said tubular work supports, rollers for supporting said members, means for raising or lowering certain of said rollers to raise or lower said tubular work supports as a unit, a shaft coaxially fixed to said spindle holder and projecting toward the next adjacent of said spaced members, a stand for each of said members supporting the rollers for such members, a vertically adjustable support carried by the stand of said next adjacent member, a coupling element secured to said shaft and journaled in said support, a coupling element secured coaxially to said next adjacent member, and an intermediate coupling member operatively connecting said coupling elements for simultaneous rotation of said elements regardless of whether or not said coupling elements are in axial alinement.

8. The combination with a spindle holder having a plurality of rotary work spindles in circular array about an axis of rotation of said holder, of a stock reel having a plurality of tubular work supports in circular array about an axis of rotation for holding portions of the work pieces projecting from said spindles, said stock reel having a plurality of stands spaced therealong for supporting said stock reel, a shaft coaxially fixed to said spindle holder and projecting toward the next adjacent of said spaced stands, a support carried by the next adjacent stand to said spindle holder, a coupling element secured to said shaft and journaled in said support, a coupling element secured coaxially to said stock reel, and an intermediate coupling member operatively connecting said coupling elements for simultaneous rotation, and means for adjusting said reel up and down with relation to said spindle holder and in or out of axial alinement with said holder in accordance with the size of the work.

CLARENCE H. ADAMS.